US012759172B2

(12) United States Patent
Fynbo

(10) Patent No.: US 12,759,172 B2
(45) Date of Patent: Oct. 13, 2026

(54) GRIPPING TOOL, A SYSTEM AND A CLAMPING TOOL, AN EXCHANGE STATION, AND A METHOD OF HANDLING OBJECTS USING THE SYSTEM OR CLAMPING TOOL

(71) Applicant: Fynbo Technology A/S, Odense S (DK)

(72) Inventor: Jens Fynbo, Gudbjerg Sydfyn (DK)

(73) Assignee: Fynbo Technology A/S, Odense S (DK)

( * ) Notice: Subject to any disclaimer, the term of this patent is extended or adjusted under 35 U.S.C. 154(b) by 362 days.

(21) Appl. No.: 17/913,130

(22) PCT Filed: Mar. 22, 2021

(86) PCT No.: PCT/DK2021/000088
§ 371 (c)(1),
(2) Date: Sep. 20, 2022

(87) PCT Pub. No.: WO2021/185420
PCT Pub. Date: Sep. 23, 2021

(65) Prior Publication Data

US 2023/0142668 A1 May 11, 2023

(30) Foreign Application Priority Data

Mar. 20, 2020 (DK) ........................... PA 2020 70177
Dec. 21, 2020 (DK) ........................... PA 2020 70860

(51) Int. Cl.
*B25J 15/10* (2006.01)
*B25J 9/00* (2006.01)
*B25J 15/08* (2006.01)

(52) U.S. Cl.
CPC ............. *B25J 15/10* (2013.01); *B25J 9/0084* (2013.01); *B25J 15/083* (2013.01)

(58) Field of Classification Search
CPC ......... B25J 9/0084; B25J 15/083; B25J 15/10
See application file for complete search history.

(56) References Cited

U.S. PATENT DOCUMENTS 4,512,709 A * 4/1985 Hennekes ............ B25J 15/0491 901/41
4,598,942 A 7/1986 Shum et al.
(Continued)

FOREIGN PATENT DOCUMENTS

CN 103963067 A 8/2014
DE 2140877 A1 2/1973
(Continued)

*Primary Examiner* — Saul Rodriguez
*Assistant Examiner* — Brendan P Tighe
(74) *Attorney, Agent, or Firm* — Dykema Gossett PLLC

(57) ABSTRACT

The present invention relates to a gripping tool, a system, a clamping tool and a method of handling objects, where the gripping tool comprises a transmission mechanism arranged in a housing, wherein the transmission mechanism is coupled to a plurality of arms located outside the housing. One or more gripping elements are arranged on each arm. The gripping elements are releasable connected to the arm to enable a quick and easy repositioning and/or exchange of the gripping elements. An exchange station may be used to reposition or exchange the gripping element.

17 Claims, 8 Drawing Sheets

(56) References Cited

U.S. PATENT DOCUMENTS

| | | | | | |
|---|---|---|---|---|---|
| 4,604,787 | A * | 8/1986 | Silvers, Jr. | B23Q 7/046 | 414/730 |
| 4,636,135 | A * | 1/1987 | Bancon | B25J 15/0491 | 483/901 |
| 4,685,850 | A * | 8/1987 | Ohta | B25J 15/0491 | 198/465.1 |
| 4,706,372 | A * | 11/1987 | Ferrero | B23B 31/30 | 901/41 |
| 4,765,669 | A | 8/1988 | Meier | | |
| 4,852,242 | A * | 8/1989 | Tella | B25J 15/0491 | 901/41 |
| 4,913,617 | A * | 4/1990 | Nicholson | B25J 9/0084 | 901/29 |
| 4,979,284 | A * | 12/1990 | McMurtry | B23Q 3/15553 | 483/31 |
| 5,002,500 | A * | 3/1991 | Zuccaro | H01R 13/53 | 439/378 |
| 5,052,736 | A | 10/1991 | Loncaric et al. | | |
| 5,161,846 | A | 11/1992 | Yakou | | |
| 5,372,567 | A * | 12/1994 | Whittington | B23Q 11/005 | 219/86.8 |
| 5,860,900 | A * | 1/1999 | Dunning | B23Q 17/00 | 414/730 |
| 5,879,277 | A * | 3/1999 | Dettman | B25J 15/0491 | 901/41 |
| 8,991,888 | B2 | 3/2015 | Schlaich et al. | | |
| 2004/0192524 | A1* | 9/2004 | Nolte | B05B 13/0431 | 483/59 |
| 2012/0298706 | A1* | 11/2012 | Gordon | B25J 15/0491 | 224/401 |
| 2013/0341944 | A1 | 12/2013 | Schlaich et al. | | |
| 2021/0268646 | A1* | 9/2021 | Wakana | B25J 19/023 | |
| 2022/0241962 | A1* | 8/2022 | Nguyen | B25J 9/1697 | |
| 2022/0266458 | A1* | 8/2022 | Fofonoff | B25J 15/0483 | |

FOREIGN PATENT DOCUMENTS

| | | | | |
|---|---|---|---|---|
| DE | 2446125 | A1 | 4/1976 | |
| DE | 3312673 | A1 | 10/1984 | |
| DE | 102007002624 | A1 | 7/2008 | |
| DE | 202009012392 | U1 | 1/2010 | |
| DE | 102013000850 | A1 | 7/2014 | |
| DE | 202017100993 | U1 | 3/2017 | |
| EP | 0074542 | A2 | 3/1983 | |
| EP | 0895967 | A1 | 2/1999 | |
| EP | 1044759 | A2 | 10/2000 | |
| EP | 2390068 | A1 * | 11/2011 | B25J 15/103 |
| EP | 2607029 | A1 | 6/2013 | |
| GB | 2030903 | A | 4/1980 | |
| JP | S58-121691 | U | 8/1983 | |
| JP | 2006082140 | A | 3/2006 | |
| JP | 2017-104967 | A | 6/2017 | |
| NL | 2021374 | B1 | 1/2020 | |
| SU | 766854 | A1 | 9/1980 | |
| WO | 2006035143 | A1 | 4/2006 | |
| WO | 2014024038 | A1 | 2/2014 | |

* cited by examiner

GRIPPING TOOL, A SYSTEM AND A CLAMPING TOOL, AN EXCHANGE STATION, AND A METHOD OF HANDLING OBJECTS USING THE SYSTEM OR CLAMPING TOOL

CROSS-REFERENCE TO RELATED APPLICATION

This application is a national stage filing based upon International application No. PCT/DK2021/000088, filed 22 Mar. 2021, which claims the benefit of priority to Denmark application No. PA 2020 70860, filed 21 Dec. 2020 and Denmark application No. PA 2020 70177, filed 20 Mar. 2020.

FIELD OF THE INVENTION

The present invention relates to a gripping tool, preferably a gripper with multiple gripping elements, configured to be coupled to an arm of a machine or to be arranged on a surface, wherein the gripping tool comprising a plurality of arms rotatably connected to a housing of the gripping tool, each arm has at least one gripping point for gripping an object.

BACKGROUND OF THE INVENTION

It is known to use gripping tools mounted on a robotic arm of a robot to handle objects during assembly, processing, sorting and packaging. The gripping tool is fitted with two or more gripping arms each designed to grip a particular object at a gripping point. The gripping arms are configured to move between various positions during the gripping process, wherein the operation of the gripping tool is controlled by a local controller in the robot unit. Optionally, the local controller may receive commands from a central controller.

It is known that the robotic arms, including their respective interfaces, are fitted with one or more joints each providing the robotic arm with at least one degree of freedom (DOF). Typically, the robotic arm has between five to seven DOFs, but some robotic arms have only two or three DOFs. The design of the gripping tool, as well as the robot unit, is selected based on the size, shape and weight of the objects intended to be handled by the robot unit.

It is known to use sensors and/or cameras for monitoring the axial movement of the robotic arm and thus the gripping tool. The signals from these sensors or cameras are then used by the local controller to correctly position the gripping arms relative to a particular object. The local controller may alternatively use a two- or three-dimensional map of the objects to position the gripping tool.

US 2013/0341944 A1 from Robert Bosch GmbH discloses a gripping device for a handling robot provided with a protective device, where the gripping device comprises three arms all connected to a common transmission mechanism arranged within the housing of the gripping device. Each arm has an elongated body extending in the radial plane, where one end is connected to a rotating shaft of the transmission mechanism by a clamping arrangement and the other end is connected to a gripping finger. The gripping finger is connected to the arm by means of a snap-in coupling designed to provide a safety overload protection. The arm has an open recess in the side surface for receiving the finger, which is held in place by the snap-in coupling.

The arms must be manually exchanged with longer arms in order to grip very large objects. A sensor must be arranged in the arm to detect an overload situation on the finger, which is used by a controller to trigger an emergency stop of the gripping device to prevent that the finger is forced out of the engagement with the arm.

EP 2390068 B1 by Schunk GmbH discloses a gripping device with three arms all connected with a pneumatically operated transmission mechanism, where each arm has an L-shaped body where the bend between the legs faces outwards from a central longitudinal axis. One leg of the arm is connected to a rotating shaft of the transmission mechanism while the other leg of the arm is at the free end connected to a gripping finger. The gripping finger is arranged on that side of the arm which is rotated into contact with an object. The arm is fixed relative to the rotation shaft by a locking pin arranged in a recess in both the rotation shaft and the arm. It is stated that this gripping device can grip circular objects with an outer diameter between 0-100 mm and annular objects with inner diameter between 10-125 mm.

However, EP 2390068 B1 is silent about how the gripping fingers are held in place in the respective arms, nor does it hint or suggest that the gripping fingers can be exchanged. The illustrated configuration suggests that the gripping fingers are firmly attached to the arm or form an integrated part of the arm.

Another example of a gripping device is the model 3FG15 by OnRobot, which comprises three arms all connected to a common transmission mechanism within a housing. Each arm has a generally L-shaped body extending in a longitudinal plane, wherein one end is mounted a small disk connected to a rotation shaft of the transmission mechanism. The gripping device has a gripping range of 20-160 mm, however the arms have to be manually moved relative to the disk using tools in order for the gripping fingers to be operated within the full gripping range. Furthermore, the gripping finger is held in place by a screw and thus also requires a tool in order to exchange the gripping finger.

Gripping devices with similar arms extending in the longitudinal plane are disclosed in CN 103963067 A, U.S. Pat. Nos. 4,598,942 A, 4,765,669 A. In the above gripping devices, the gripping process is performed in the radial plane. U.S. Pat. No. 4,765,669 A further discloses that each finger is slidably arranged in recesses in a front plate, where a receptable is attached to the top of the finger and a ball is provided in the receptable for engaging a matching recess in an internal disk located above the fingers.

EP 0074542 A1 discloses a gripping tool with three rotatable arms each coupled to a rotation shaft of the rotating mechanism. A stop element with three radial fingers is attached to the centre of the gripping tool, where each gripping finger is abutting an inner curved part of a radial finger. The arm of EP 0074542 A1 has a single recess for receiving the gripping finger, where a small screw on the arm is used to lock the gripping finger inside the recess.

DE 3312673 A1 discloses a gripping tool comprising a drive mechanism arranged inside a housing, wherein the drive mechanism is connected to three arms fitted with a gripping finger. The arms are clamped onto the respective rotation shafts and the gripping fingers are screwed onto the opposite end of the respective arms. Thus, a tool is needed when exchanging the gripping fingers.

Therefore, a need exists for a gripping or clamping tool with improved flexibility, operating range and lifting capacity.

OBJECT OF THE INVENTION

An object of the invention is to provide a gripping tool capable of solving the abovementioned problems.

Another object of the invention is to provide a gripping tool that can be operated in the full gripping range.

A further object of the invention is to provide a gripping tool enabling the positions of the gripping fingers to be adjusted without the use of tools.

A further object of the invention is to provide a gripping tool enabling an easy exchange of the gripping fingers.

DESCRIPTION OF THE INVENTION

An object of the invention is achieved by a gripping tool for handling objects in a process, comprising:

a housing defining a longitudinal axis of the gripping tool, a drive mechanism arranged with the housing, an interface arranged at one end of the housing, the interface being configured to be coupled to a matching interface of a machine or to be arranged on a surface, a plurality of arms being arranged at an opposite end of the housing, each arm comprising at least one gripping element configured to be brought into contact with the object, each arm is configured to be rotated around a rotation axis, when activated by the drive mechanism, in or out of contact with an object in a radial plane perpendicular to the longitudinal axis, wherein each arm comprises a body extending from a first end to a second end and having a top side, a bottom side, a first side and a second side, wherein each arm comprises one mounting position for the at least one gripping element arranged in the top side, characterised in that the at least one gripping element is releasable connected to that arm via a quick-release coupling.

Here, the term "releasable connected" should be understood as the griping element and arm being specifically designed to be removed to enable replacement or repositioning of the gripping element. The term "quick-release" should here be understood as a coupling that can be operated without the use of tools, such as screwdrivers or wrenches.

This provides an alternative design of a gripping tool for robotic or clamping applications having an improved flexibility compared to conventional gripping tools of the same type. The present gripping tool has a compact and lightweight design and provides an increased lifting capacity.

The gripping tool has a protective housing extending in a longitudinal direction from a first end to a second end. The housing further extends in a radial direction and forms an outer surface and an inner surface, wherein the inner surface, the first end and second end together form an internal chamber. The housing may be made of any suitable materials, preferably a lightweight material, e.g. a plastic material, a fibre-reinforced material or metal, e.g. aluminium or stainless steel. The drive mechanism, electrical components and other sensitive components may thus be shielded from dust, moisture, hazardous gasses and other particles found in the environment in which the gripping tool is placed.

The first end may be adapted to form an interface for mounting the gripping tool to a machine or an adapter element, as described later. The interface may comprise other coupling elements for supplying pressurised air or oil, electrical power and/or control signals to the gripping tool. This saves weight and costs as the gripping tool can be driven by an external energy source. This also allows for simple and quick mounting of the gripping tool. Alternatively, the gripping tool may comprise an internal energy source, e.g. a battery, a photovoltaic cell, or a combination thereof.

The second end may comprise an end plate for closing the internal chamber. Rotation shafts may extend through the end plate to enable the arms to be coupled to the drive mechanism. The openings in the end plate may further be sealed off to prevent dust, moisture, hazardous gasses and other particles from entering the internal chamber. Alternatively, the arms may be connected to a pin projecting from the end plate and actuators may be coupled to the arms for activating the arms. Linear actuators, hydraulic actuators, pneumatic actuators or electromechanical actuators may be used to rotate the arms around the projecting pin. This allows only electrical cables or fluid hoses to extend through the end plate, thus allowing for a better seal of the end plate.

Each arm has a body extending in the radial plane from a first end to a second end. The first end is configured to be connected to the rotation shaft or projecting pin for enabling the arm to be rotated within the radial plane. The second end forms a free end of the arm. The body further has a top side, a bottom side, a first side and a second side. When placed in a retracted position, the second end is positioned in a minimum radial distance from a central longitudinal axis of the housing and thus the gripping tool. When placed in an extended position, the second end is positioned in a maximum radial distance from the central longitudinal axis.

Each arm may be arranged relative to the end plate and be able to rotate around a local rotation axis defined by its rotation shaft or projecting pin. At least two arms, preferably three arms, are coupled to the drive mechanism or to individual actuators. The local rotation axis for each arm may be located at a radial distance from the longitudinal axis, preferably at equal radial distances. The radial plane may be located at a longitudinal distance from the interface of the machine. Due to the compact and lightweight design, this longitudinal distance is reduced to a minimum and thereby allows for a higher lifting capacity.

The gripping element may have a recess arranged in an outer surface which is shaped to engage at least one projecting flange on an exchange station. The recess may be positioned at a top end of the gripping element. The at least one flange may be arranged in a recess in the exchange station, where the recess may be shaped to receive the top end of the gripping element. This allows the gripping element to be positioned in the exchange station when not in use or during repositioning.

The activation element on the gripping finger may be engaged when the gripping finger is moved into the recess. Thereby automatically unlocking the coupling. The gripping finger may be moved, e.g. slid, along the recess until the flanges engage the recesses on the gripping finger. Thereby enabling the gripping finger to be maintained in its unlocked state. The arm may thus be removed from the gripping finger, or vice versa, to enable a repositioning or replacement of the gripping finger.

The dimensions and shape of the recess may be adapted to a particular design of the gripping finger. Alternatively, the recess may be shaped to receive different shapes of gripping fingers.

According to one embodiment, one of the first and second coupling parts is a hole and the other of the first and second coupling parts is a pin projecting from a surface of the arm or gripping element.

The configuration of the release connection may be adapted to the shape and dimensions of the arm and/or the gripping element. Alternatively, the configuration of the release connection may be standardised to fit different designs of the arm and/or the gripping element.

In one example, the mounting points may be formed by a plurality of individual holes arranged in the top surface of the arm. Alternatively, the mounting points may be formed by an elongated hole where the gripping element may be placed at any position along the local length of the elongated hole. The holes or elongated hole may be a cavity (non-through hole) or a through hole. The elongated hole may comprise a box joint having a plurality of slots each of which defines a selective position for the gripping element. An optional flange may be arranged inside the hole and project from an inner surface of the hole. The hole, or the internal flange, may thus act as the first coupling part.

The gripping element may comprise a pin projecting from a bottom surface of the gripping element. The pin may be configured to be inserted into the abovementioned hole on the arm. The pin may form the internal chamber in which the release element may be arranged. The locking elements may be arranged in a local outer surface on the pin and interact with the release element. The pin may have a local height less than a local depth of the hole so that the locking elements are concealed within the hole. The pin may also have a local height greater than a local depth of the hole so that the locking elements may contact a bottom surface of the arm. The pin may thus act as the second coupling part.

In another example, the mounting points may be formed by a plurality of individual pins, e.g. clamping pins, arranged on the top surface of the arm. The pins may be integrally formed with the arm or be attached to the arm. The pin may have a local recess arranged in a local outer surface for partly receiving the locking elements on the gripping element. The pin may thus act as the first coupling part.

The gripping element may comprise a cavity arranged in the bottom surface, which is configured to receive the abovementioned pin on the arm. The cavity may thus act as the second coupling part. The gripping element may form the internal chamber in which the release element may be arranged. Alternatively, the release element may be a moveable sleeve arranged on the outer surface of the gripping element. The locking elements may be arranged on or in an inner surface of the cavity and interact with the release element.

However, other configurations of the quick-release connection may also be used.

According to one embodiment, the at least first gripping element is shaped as a finger or an elongated gripping element extending along at least a part of a length of the arm.

Preferably, the gripping element may be shaped as a gripping finger having a predetermined cross-section and a predetermined profile along its longitudinal axis. The gripping finger may have any suitable cross-sectional profile and/or longitudinal profile. In example, the gripping finger may have a circular, elliptic, polygonal, triangular, rectangular or another suitable cross-section. The griping element may have a constant profile along its longitudinal axis, alternative the profile may vary along the longitudinal axis. This allows the gripping finger to have a body adapted to contact one or more desired types of objects.

The gripping element may be shaped as an elongated gripping element having a predetermined profile. The elongated gripping element may extend in a longitudinal direction from a local first end to a local second end and further in a height direction from a bottom side to a top side. The elongated gripping element may have a stepped profile tapering from the first end to the second end, or vice versa.

The arms and/or the gripping elements may be made of any suitable material, preferably a lightweight material, e.g. a plastic material, a fibre-reinforced material or metal, e.g. aluminium or stainless steel. However, other materials may also be used. Further, the gripping element may be covered with a soft material, a material with a higher friction coefficient than the rest of the gripping element, or a material with a rough surface or a surface microstructure. Alternatively, the gripping element may be made of a soft material, a material with a high friction coefficient, or a material with a rough surface or a surface microstructure. Such materials are known to the skilled person and will not be described in further details.

The number of gripping elements on each arm may be selected depending on the particular application and the dimensions of the objects. In example, a single gripping element or multiple gripping elements may be arranged on the arm. The gripping element(s) may extend perpendicularly relative to the radial pane or be placed at an angle relative to the radial plane.

The local position of the gripping element(s) on the arm may be adapted to the particular applications and the dimensions of the objects. Optionally, the free end, e.g. the second end, of the arm may also act as a gripping element. This allows the gripping tool to grip objects of different sizes and shapes A first gripping element may be arranged at an outermost position on the arm, e.g. at the second end. This allows the gripping tool to grip large objects. Alternatively or additionally, one or more second gripping elements may be arranged at one or more intermediate positions or at an innermost position on the arm. This allows the gripping tool to grip small and medium-sized objects.

According to one embodiment, the at least first gripping element is configured to be operated within a full gripping range of the gripping tool while maintaining each arm in the same radial position relative to each rotation axis.

Unlike conventional gripping tools, the present gripping tool may be operated within the full gripping range of the gripping tool without having to adjust the radial positions of the arms.

This may be achieved by providing more than one gripping element on the respective arms, where an innermost gripping element may be rotated into a minimum gripping position and an outermost gripping element may be rotated into a maximum gripping position. The minimum and maximum gripping positions define together the maximum or full gripping range of the gripping tool.

If the arm is fitted with a single gripping element, then the retracted and extended positions of the arms together define a local gripping range of the gripping tool. The gripping tool may be operated within the full gripping range by simply repositioning the gripping element.

An object of the invention is also achieved by a system configured to handle objects in a process, comprising:

a machine configured to process an object, the machine comprises at least one interface configured to be coupled to at least one gripping tool as described above, the machine further comprises an energy source for supplying power to the gripping tool and a controller configured to at least control the operation of the gripping tool.

This provides a system with improved gripping flexibility and increased lifting capacity. The present gripping tool is able to grip objects of different sizes and shapes by simply exchanging or repositioning the gripping element without the use of tools.

The first end of the gripping tool may be mounted onto the machine without the use of tools, e.g. using a screw coupling or a release connection. Alternatively, fasteners may be used to mount the gripping tool to the machine. The gripping tool may thus be driven by an energy source located in the machine. This also allows for simple and quick mounting of the gripping tool.

The machine comprises a matching interface configured to be coupled to the interface of the above gripping tool. This interface may further comprise electrical coupling elements and/or hose coupling elements for connecting the drive mechanism of the gripping tool to an energy source in the machine. The energy source may be configured to provide pneumatic, hydraulic or electrical power to the gripping tool. This allows the gripping tool to be powered via the machine.

The machine further comprises a controller configured to at least control the operation of the gripping tool. The machine may be fitted with suitable means for manipulating, working and/or treating the object. The operation of these means may also be controlled by the controller. The gripping tool may load the object into machine, hold the object during the process, and/or unload the processed object from the machine. The machine may be any machine in which a gripping tool is used and where either a process is performed on the object or the object forms part of the process.

Optionally, the controller may be electrically connected to one or more sensors in the gripping tool via the interface. The controller may use these sensor signals to control the axial movement of the gripping tool and/or the activation of the gripping elements.

According to one embodiment, the machine is a robot unit with at least one robotic arm, wherein the robotic arm extends from a base end to a free end, the matching interface being located at the free end of the robotic arm.

The robot unit, i.e. first robot unit, comprises one or more robotic arms each extending from a base end to a free end. The robotic arm may comprise one or more joints so that it is able to move in multiple axial directions. The controller is configured to control the operation of the robot arm and also the gripping tool attached to the robotic arm. The robot tool may thus have a compact and lightweight configuration.

The controller may be connected to a user interface configured to enable a worker, or an artificial intelligence (AI), to program and/or operate the robot unit. The user interface may be a user terminal located on the robot unit. The user interface may also be a remote terminal or computing device. The robot unit may be programmed and operated using known techniques or an AI system.

The machine, or robot unit, may be fitted one or more sensors for sensing the axial movement of the tool. The sensor may be an accelerometer, a gyroscope or another suitable sensor. This allows the controller to monitor the axial movement of the robotic arm and thus the tool based on signals from these sensors.

Alternatively or additionally, the gripping tool may be fitted with one or more sensors for detecting the position of the gripping tool relative to an object. The sensors may be a vision sensor, a tactile sensor, an ultrasonic sensor, a proximity sensor, a force torque sensor or another suitable sensor. These sensors may be electrically connected to the controller via the interfaces. This allows the controller to correctly position the gripping tool relative to the object based on the sensor signals. The controller may optionally use two- or three-dimensional maps of the objects to correctly position the gripping tool.

The controller may adjust the position of the gripping tool so that it is aligned with a centre of gravity of the object. The controller may use the signal from the force torque sensor to detect any misalignment between the gripping tool and the object and/or any loads extending the safety thresholds. The controller may then reposition the gripping tool accordingly. Alternatively, objects may be gripped even if the gripping tool is misaligned. The local controller may then compensate for this misalignment by adjusting the orientation of the object.

An object of the invention is further achieved by a clamping tool configured to handle objects in a process, the clamping tool being configured to be arranged on a surface, the clamping tool comprising:

a gripping tool as described above, a local controller configured to control the operation of the gripping tool, wherein the local controller is electrically connected to at least one of a remote user interface or a local user interface, at least one of a local energy source or coupling elements configured to be connected to an external energy source, the local or external energy source being configured to supply power to the clamping tool.

This provides a clamping tool with improved gripping flexibility and increased lifting capacity. The present gripping tool is able to grip objects of different sizes and shapes. The clamping tool is adapted to be arranged on different surfaces for easy placement of the clamping tool.

The clamping tool may comprise coupling elements for supplying pressurised air or oil, electrical power and/or control signals to the gripping tool. This saves weight and costs as the gripping tool can be driven by an external energy source. Alternatively, the gripping tool may comprise an internal energy source, e.g. a battery, a photovoltaic cell, or a combination thereof. This allows the clamping tool to be configured as a stand-alone unit.

The clamping tool has a local controller, e.g. arranged in the gripping tool, configured to control the operation of the clamping tool and is electrically connected to the energy source. The local controller may be a microprocessor, an electrical circuit, a programmable logic circuit or another suitable controller. The local controller may further be electrically connected to the sensors in the gripping tool mentioned earlier, wherein the local controller uses these sensor signals to control the operation of the gripping tool.

According to one embodiment, the clamping tool further comprises an adapter element having a bottom surface shaped to be arranged on the surface, the adapter element further has a top surface configured to be coupled to or integrated into the interface of the gripping tool.

The housing, and optionally the first end, of the gripping tool may be made of a heavy material, such as cast iron or steel, or have an increased wall thickness. The first end forming the interface may thus be shaped to be simply placed onto a particular surface, e.g. of a table.

The first end may also be shaped as a bracket configured to be mounted onto the surface by fasteners, or the bracket may be fixed to surface using clamps. The first end may alternatively comprise suction cups, high friction pads, magnets and/or spikes. This allows the clamping tool to be placed on a low friction surface, an inclined surface or even a vertical surface.

The clamping tool may further comprise an adapter element configured to be attached to the first end of the gripping tool, alternatively the adapter element may be integrated into the first end. The adapter element may have a bottom side shaped to be brought into contact with the surface. The adapter element may further have a top side shaped to be attached to the gripping tool or shaped to form the first end of the housing of the gripping tool. The adapter element may be configured to enable the gripping tool to be correctly orientated relative to the surface.

The bottom side and top side may be arranged in parallel or arranged at an angle so that the gripping tool is tilted relative to the surface. The adapter element may comprise an adjustable mechanism so that the top side can be tilted around one or more tilting axis. This allows the gripping tool to be correctly orientated relative to the surface so the object is placed in an optimal position for processing.

The clamping tool further comprises a user interface configured to enable a worker to operate the gripping tool. The user interface may be a user terminal, a graphical user interface, push buttons or another suitable user interface. Alternatively or additionally, the clamping tool may comprise a wireless transceiver, e.g. an antenna, adapted to wirelessly communicate with a remote device, e.g. a user terminal or a computing device. The computing device may be a tablet, a smartphone, a laptop, a PDA, a phablet or another suitable computing device. A computing program, or application, may be configured to run on the computing device may thus communicate with the local controller via suitable control signals. This allows the worker to operate the gripping tool, preferably in an intuitive manner.

An object of the invention is further achieved by an exchange station configured to interact with the gripping tool as described above, wherein the exchange station comprises:

a support element, at least one holding element arranged on a top surface of the support element, the at least holding element being configured to engage a matching holding element on at least one gripping element.

This increases the versatility of the gripping tool as it can be used together with an exchange station for repositioning and/or exchanging the griping element. The exchange station may temporarily hold the gripping element during the repositioning. The exchange station may also hold a kit of gripping elements for exchanging the gripping element(s) on the gripping tool.

The support element comprises a top surface having one or more holding positions for holding one or more gripping elements. Each holding position may be dedicated to hold a gripping element with specific design. Alternatively, each holding position may act as a universal holding position for holding gripping elements with different designs. This allows the exchange station to be adapted to fit different gripping elements.

The holding position may be formed by a coupling part configured to interlock with a matching coupling part on the gripping element. The two coupling parts may form a release connection, preferably a quick-release coupling. In example, the coupling part of the exchange station may be a pin, e.g. a clamping pin, projecting from a top surface thereof. This allows for a quick and simple removal or positioning of a gripping element without the use of tools.

According to one embodiment, the at least one holding element is arranged in a recess in the top surface, wherein the recess is configured to receive a top end of the at least one gripping element.

The top surface may preferably comprise a single recess or a plurality of recesses, each shaped to receive a top end of the gripping element. The recess(es) may have a predetermined shape and dimensions matching that of the top end of the gripping element. This allows the gripping element to be positioned in the exchange station while still being locked to the arm. This also allows the arm of the gripping tool to be repositioned relative to the gripping element.

The bottom surface of the recess may optionally be used to active the release element of the gripping element, when inserting the gipping element into the recess. The gripping element may thus be automatically unlocked when positioned in the exchange station. This allows the gripping element to be removed from the arm without having to manually activate the release connection.

The holding element may be local flanges projecting from an inner surface of the recess, wherein the local flanges are configured to engage with a recess on the top end of the gripping element. The recess may be an elongated recess with the flanges arranged at one end. This allows for the gripping element to be inserted at the other end and then slid along the recess until the flanges engages the recess on the gripping element. This holds the gripping element in place on the exchange station.

According to one embodiment, the support element is a base configured to be positioned on or fixed to a reference surface, or the support element comprises an interface configured to be coupled to a matching interface of a machine as described above.

The support element may be formed as a base, e.g. a plate, on which the individual holding positions may be located. A single holding position or a plurality of holding positions may be arranged on the base. The base may be configured to provide easy access to the individual holding positions as well as the individual gripping elements. This allows for an easy storage of the various gripping elements. This also allows for an easy exchange or repositioning of the gripping element.

The base may be adapted to be fixed relative to a reference surface, e.g. by integrated or separate clamps or by fasteners. The base may also be glued or welding to the reference surface. Other techniques may also be used. Optionally, the base may comprise a set of support feet or mounting brackets for positioning or mounting the exchange station. In example, the base may be arranged on the machine, e.g. robot unit, so that an operator or a robotic arm can interact with the exchange station. The exchange station may thus act as a stationary unit.

The base may also comprise an interface configured to be coupled to a matching interface on the abovementioned machine or another machine, e.g. the free end of a robotic arm. The exchange station may thus be positioned relative to the gripping tool using said machine. In example, the base may be coupled to an interface on a robotic arm of a second robot unit, which may interact with the gripping tool located on the machine, e.g. the first robot unit. The exchange station may thus act as a mobile unit.

According to one embodiment, the exchange station is configured to hold a kit of gripping elements dedicated for the gripping tool or a set of gripping elements for a type of objects.

The base may preferably be configured to hold a kit of gripping elements dedicated for the gripping tool. The individual gripping elements have different heights and/or different profiles. The gripping elements may be arranged in a predetermined pattern on the base to enable easy access to each gripping element. Preferably the distance between adjacent gripping elements in a row and/or column may be adapted so that the gripping tool may interact with a selected gripping element without the other griping elements limiting the interaction. This increases the versatility of the exchange station.

The base may also be configured to hold a small number of gripping elements, e.g. a single gripping element. Here, said "small number" relates to a sub-set of the total number of gripping elements. The gripping elements may be selected dependent on the size and dimensions of the objects intended to be processed. This reduces the size and weight of the exchange station.

Optionally, two or more exchange stations may interact with the abovementioned gripping tool. A first exchange station may be dedicated to hold said kit of gripping elements while at least a second exchange station may be dedicated to hold at least said small number of gripping elements. Alternatively, a first exchange sub-station may be dedicated to hold a first set of gripping elements for a first type of objects and at least a second exchange sub-station may be dedicated to hold at least a second set of gripping elements for at least a second type of objects. This allows use of dedicated exchange stations for different types of objects. This also allows one exchange station to be used for repositioning and another exchange station for exchange of the gripping element.

An object of the invention is further achieved by a method of handling objects in a process using a system or a clamping tool as described above, comprising the steps of:

- placing the gripping tool in an unloaded state;
- activating a release connection between the arm and a first gripping element to remove said first gripping element;
  - repositioning said first gripping element in a second mounting position on the arm, and/or
  - positioning a second gripping element in the first mounting position or in a second mounting position on the arm;
- and reconnecting the first or second gripping element to the arm by locking the release connection.

This provides a method of manipulating objects where the abovementioned gripping tool is able to grip objects of different sizes and shapes. This increases the flexibility of the gripping tool as no tools are needed to adapt the gripping fingers to specific objects. This also increases the gripping capacity compared to conventional gripping tools as the distance between the radial plane of the arms and the interface of the machine is reduced to a minimum, thus reducing the bending moment.

The gripping tool is adapted to handle different objects before processing by simply removing the gripping element from the arm by activating the release connection. The gripping element is then repositioned relative to another mounting position on the arm. Alternatively or additionally, another gripping element is positioned in the same or another mounting position. The gripping element is coupled to the arm again by simply locking the release connection. This eliminates the need for repositioning the arm on the disk. The adjustment can be made manually without tools.

The objects may be fed into a loading position relative to the machine, either individually or in groups. The gripping tool may then be moved into position relative to a selected object. The gripping elements may be rotated into an open position by the drive mechanism. The gripping tool may be moved further towards the object and the gripping elements may be moved into contact with the object to apply a gripping force.

The object may then be lifted out of its position and manipulated by the machine into a new position and/or orientation. The gripping tool may be moved further towards an unloading position. The gripping elements may then be moved out of contact with the object and the gripping tool may be moved away from the object. The process may then be repeated for the next object.

The object may instead be moved into position relative to the clamping tool. The gripping elements may be rotated into an open position prior to positioning the object. The gripping elements may afterwards be rotated into contact with the object. The object may then undergo a suitable process while being held in place by the clamping tool. The gripping elements may subsequently be rotated out of contact with the object and the processed object may be removed from the gripping tool.

The objects may have a circular or elliptical cross section, or a polygon shaped cross section. These objects may suitable be gripped by the gripping fingers contacting the exterior surface of the object. The gripping tool may have a first gripping range when the gripping elements are moved into contact with an exterior surface of the object.

The gripping tool may also be configured to grip objects by rotating the gripping fingers into contact with an internal surface of the object. Such objects may have an annular or ring-shaped profile. The object may also comprise an open-ended spacing, e.g. a cavity or a through hole, where the gripping fingers are contacting an inner surface of that spacing. The gripping tool may have a second gripping range when the gripping elements are moved into contact with an interior surface of the object.

According to one embodiment, the method further comprises:

- said removing the first gripping element and said reconnecting the first or second gripping element is performed manually.

An operator may simply activate the release element in the coupling to unlock the release connection. Alternatively, the release connection may be activated by applying a pulling force to the gripping finger greater than the locking force. The old gripping element may then be removed from the arm. The operator may subsequently position a new gripping element in the same mounting position or in a new mounting position on the arm. The operator may lock the release connection by simply terminate the activation of the release element of the gripping element. Alternatively, the release connection may be relocked by pushing the coupling parts on the arm and gripping element into engagement. The gripping element may thus be replaced or repositioned manually by the operator without the use of tools.

According to one embodiment, the method further comprises:

- said activating of the release connection is performed by moving the arm, e.g. axially, relative to an exchange station to bring the first gripping element into a holding position on the exchange station;
- repositioning the arm relative to the exchange station to align the first or second gripping element relative to the first or second mounting position on the arm,
- said reconnecting of the first or second gripping element is performed by further moving the arm, e.g. axially, relative to the exchange station to bring the first or second gripping element into the first or second mounting position on the arm.

The gripping element may also be replaced or repositioned automatically using an exchange station. Here, the gripping tool may be moved while the exchange station may be kept stationary.

The robot unit may move the robotic arm into aligned with a holding position on the exchange station. The gripping element is then moved into a recess on the exchange station. This may automatically activate the release connection. The gripping element may then be moved along the recess via the robotic arm until flanges on the recess engage a recess on the gripping element. The gripping element may thus be removed from the arm by moving robotic arm away from the exchange station. Alternatively, the coupling parts of the release connection may be unlocked as the robotic arm is moved away by applying a pulling force to the arm that is greater than the locking force.

The arm may afterwards be repositioned relative to another gripping element on the exchange station. The robotic arm may be used to align a mounting position on the arm with the new gripping element. The arm may then be moved towards the new gripping element until the coupling parts of the gripping element and the arm engage each other. The robotic arm may afterwards move the gripping element back along the recess so that the flanges disengage the recess. The arm and gripping element may then be moved away from the exchange station. This may automatically lock the release connection. Alternatively, the coupling parts of the release connection may be locked as the arm is moved by the robotic arm into engagement with the gripping element.

Instead, the exchange station may be positioned relative to the gripping tool. Here, the exchange station may be coupled to a robotic arm of a second robot unit. The gripping element may be removed in a process similar to the ones described above, expect that the exchange station may be moved while the gripping tool may be kept stationary.

Further, the gripping element may be repositioned or exchanged in a process similar to the ones described above, expect that the exchange station may be moved while the gripping tool may be kept stationary. This provides an alternative method of repositioning and/or exchanging the gripping element.

The gripping tool and exchange station may be operated using one or more robot units. This allows for an automated process where the gripping tool is capable of automatically adapting its gripping elements to handle different types of objects. The operator is then free to perform other tasks, e.g. control the supply of objects to the machine or clamping tool. Further, the operation and adaption of the gripping tool do not require specialists and can thus be performed by workers at the factory. This saves costs and reduces downtime.

The gripping tool may also be coupled to a tool connecter for mounting multiple of tools, such as multiple gripping tools or a combination of the gripping tool and another tool. Preferably, the tool connector may be configured so that at least two tools can be mounted at the same time, but three, four or more tools may also be mounted. The tool connecter may be arranged between the interfaces of the gripping tool and of the machine. The tool connector may be shaped so that the radial plane of the arms may be arranged perpendicularly to the interface of the machine. Alternatively, the radial plane of the arms may be arranged at an acute angle, e.g. between 30-60 degrees, to the interface of the machine. This allows multiple gripping tools to be connected to the machine at the same time, wherein the gripping tools can be operated simultaneously or individually.

DESCRIPTION OF THE DRAWING

The invention is described by example only and with reference to the drawings, wherein.

Figure 1:
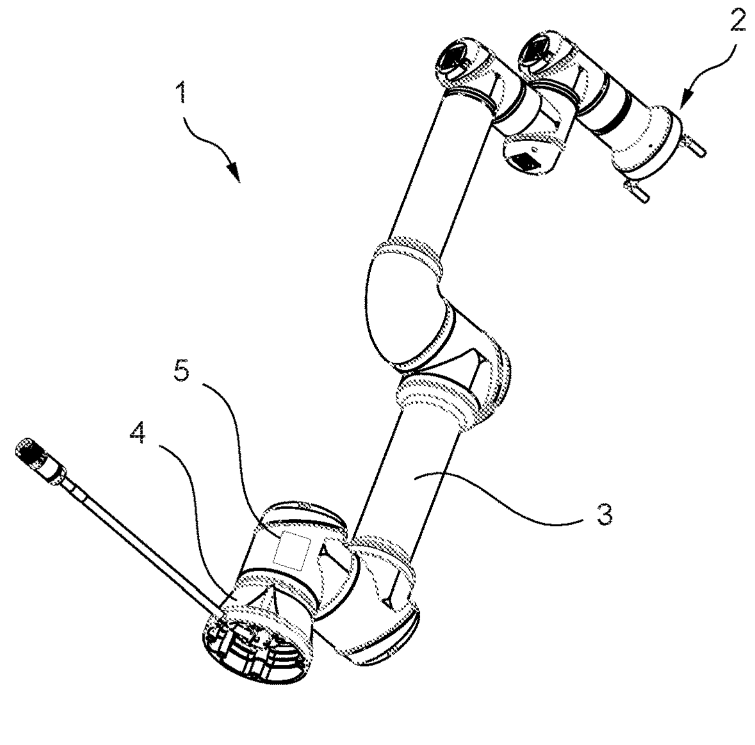
FIG. 1 shows an exemplary embodiment of a robot unit with a gripping tool.

In the following text, the figures will be described one by one and the different parts and positions seen in the figures will be numbered with the same numbers in the different figures. Not all parts and positions indicated in a specific figure will necessarily be discussed together with that figure.

REFERENCE LIST

1. Robot unit
2. Gripping tool
3. Robotic arm
4. Base
5. Local controller
6. Objects
7. Housing
8. First interface
9. Second interface
10. Transmission mechanism
11. Arms
12. Gripping fingers
12*a*. First gripping finger
12*b*. Second gripping finger
13. Second end
14. Release connection
15. First coupling part
16. Second coupling part
17. Locking element
18. Flange 19. Recess
20. Release element
21. Pin
22. Recess
23. Top side
24. Elongated gripping element
25. Second end
26. First end
27. Bottom end
28. Exchange station
29. Base
30. Recess
31. Flanges
32. Elongated hole
33. Slots
34. Clamping tool
35. Surface
36. Adapter element
37. Tool connector

DETAILED DESCRIPTION OF THE INVENTION

FIG. 1 shows an exemplary embodiment of a robot unit 1 with a gripping tool 2 coupled to a robotic arm 3 of the robot unit 1. Here, the robotic arm 3 extends from a base 4 to a free end at which the interface 9 is arranged. The robot unit 1 further comprises a local controller 5 configured to control the operation of the robotic arm 3 and the gripping tool 2.

Figure 2:
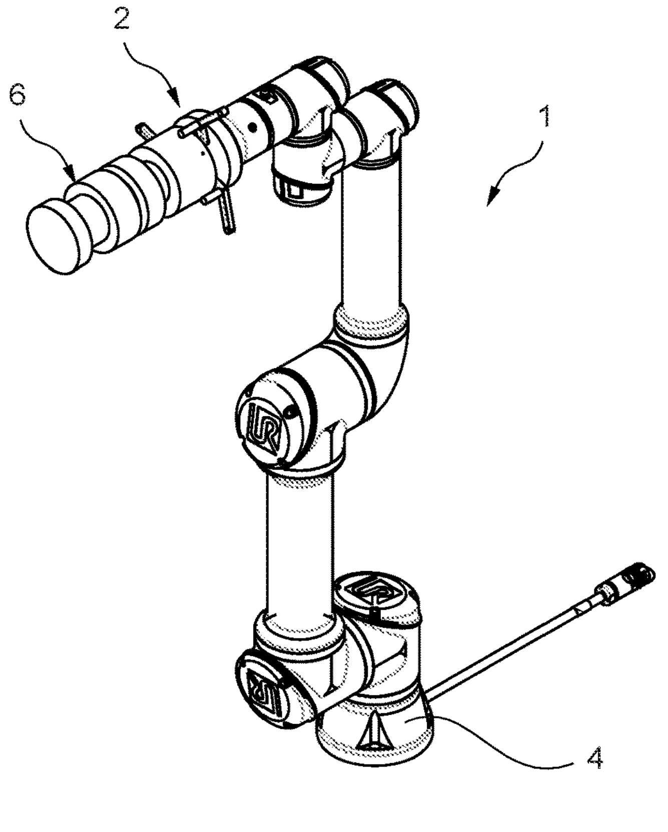
FIG. 2 shows the robot unit of FIG. 1 with an object.
Figure 3:
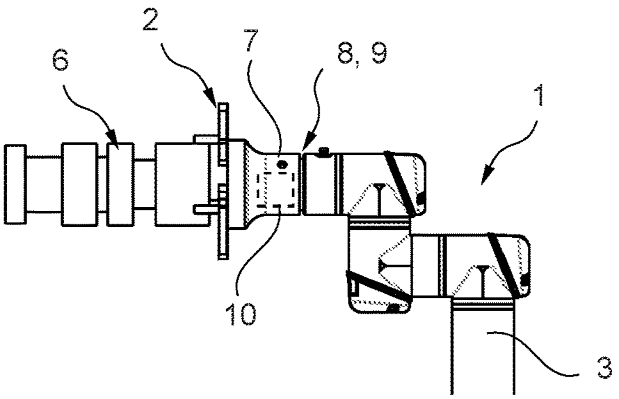
FIG. 3 shows a side view of the robot unit with the object.

FIGS. 2 and 3 show the robot unit 1 with an object 6 gripped by the gripping tool 2. The gripping tool 2 comprises a housing 7 having a first end and an opposite second end. The first end is formed as first interface 8 configured to be mounted to a matching second interface 9 of the robotic arm 3. A transmission mechanism 10 is arranged inside the housing 7 and connected to a number of arms 11 via individual rotation shafts (not shown). The transmission mechanism 10 is further configured to receive power via the first and second interface 8, 9.

As indicated in FIG. 3, the arms 11 form a radial plane in which each arm is rotated around a rotation axis defined by the rotation shaft thereof. The radial plane is perpendicular to a longitudinal axis (marked in FIG. 5*a* with "A") of the gripping tool 2 extending through the first and second ends. The radial plane is arranged at a minimum distance from another radial plane defined by the first and second interfaces 8, 9.

Figure 4A:
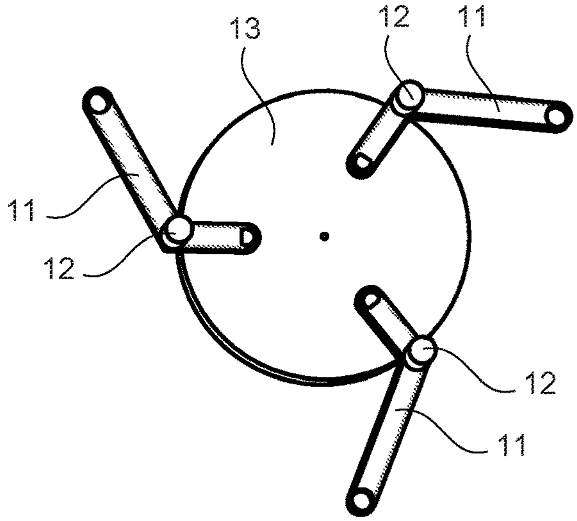
FIGS. 4*a-b* show a first embodiment of the arms with gripping fingers in a retracted position and in an extended position.
Figure 4B:
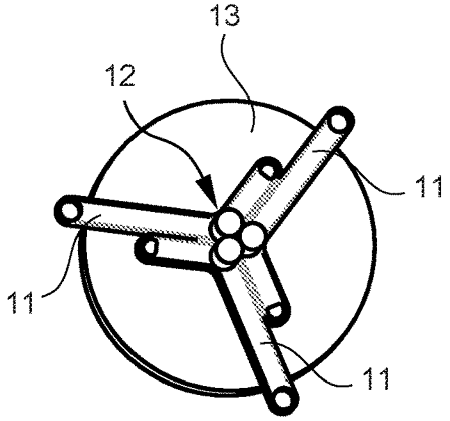

FIGS. 4*a*-*b* show a first configuration of the arms 11 each fitted with a gripping element 12 arranged at an intermediate position on the arm 11. Here, the gripping elements 12 are shaped as fingers. FIG. 4*a* shows the arms 11 and gripping elements 12 rotated into an extended position while FIG. 4*b* shows the arms 11 and the gripping elements 12 rotated into a retracted position.

The arms 11 and gripping elements 12 are rotated relative to the second end 13 of the housing 7 within the radial plane. Each arm 11 comprises a body extending from a first end to a second end and has a top side, a bottom side, a first side and a second side. In FIG. 4*a*, the gripping elements 12 are rotated to an extended position indicating a local maximum gripping position. In FIG. 4*b*, the gripping elements 12 are rotated to a retracted position. This position indicates a minimum gripping position of the gripping tool 2.

Figure 5A:
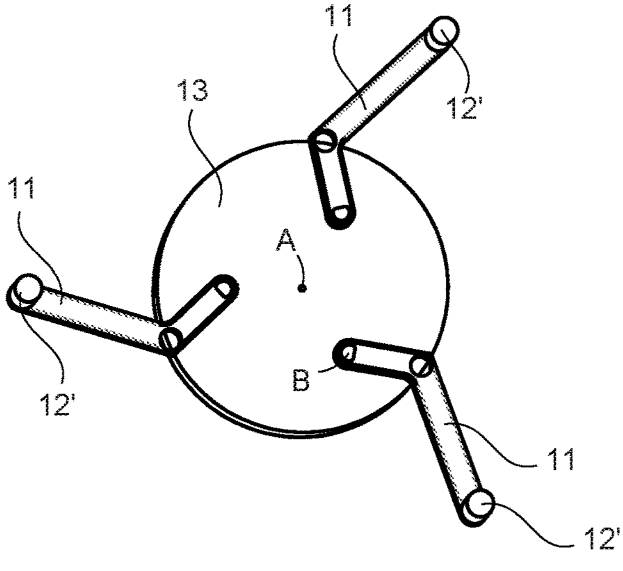
FIGS. 5*a-b* show a second embodiment of the arms with gripping fingers in a retracted position and in an extended position.
Figure 5B:
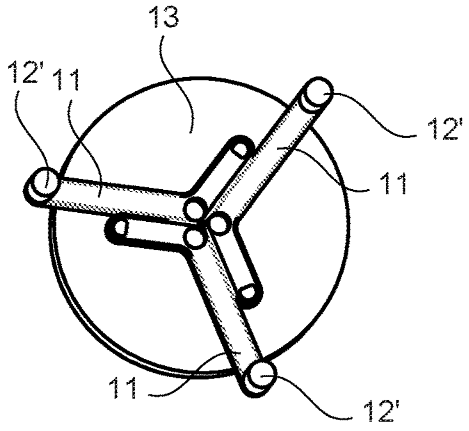

FIGS. 5*a*-*b* show a second configuration of the arms 11 each fitted with a gripping element 12' arranged at an outermost position on the arm 11. FIG. 5*a* shows the arms 11 and gripping elements 12' rotated into an extended position while FIG. 5*b* shows the arms 11 and the gripping elements 12' rotated into a retracted position.

The arms 11 and gripping elements 12' are rotated relative to the second end 13 of the housing 7 within the radial plane. In FIG. 5*a*, the gripping elements 12' are rotated to an extended position indicating a maximum gripping position of the gripping tool 2. In FIG. 5*b*, the gripping elements 12' are rotated to a retracted position. This position indicates a local minimum gripping position.

Figure 6:
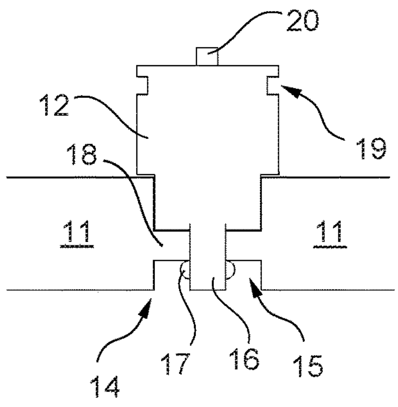
FIG. 6 shows a first embodiment of a release connection between the arm and the gripping element in a locked state.

FIG. 6 shows a first embodiment of a release connection 14 between the arm 11 and the gripping element 12 in the form of a quick-release coupling. The release connection 14 comprises a first coupling part 15 arranged on the arm 11 and a second coupling part 16 arranged on the gripping element 12. Here, the quick-release coupling is formed by a hole in the arm 11 and the second coupling part 16 is formed by a pin projecting from a bottom end of the gripping element 12.

The second coupling part 16 comprises at least one locking element 17 configured to interlock the first and second coupling parts 15, 16 relative to each other. Here, the locking element 17 is a ball. The locking element 17 is configured to engage an internal flange 18 projecting from an inner surface of the hole. This locks the coupling parts 15, 16 and thus the gripping element 12 to the arm 11.

Figure 8:
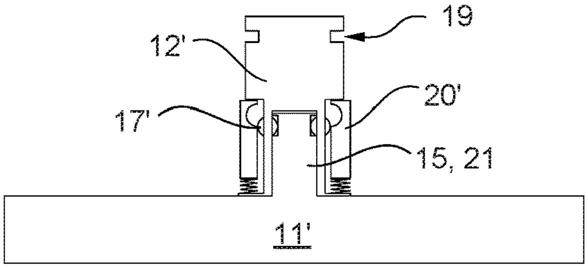
FIG. 8 shows a second embodiment of the release connection between the arm and the gripping element in a locked state.

A recess 19 is formed in the top end of the gripping element 12 and configured to engage flanges on an exchange station (shown in FIG. 8).

The gripping element 12 further comprises a release element 20 arranged in an internal chamber of the gripping element 12. The release element 20 is moveable arranged inside the chamber and is contacting the locking elements 17.

Figure 7:
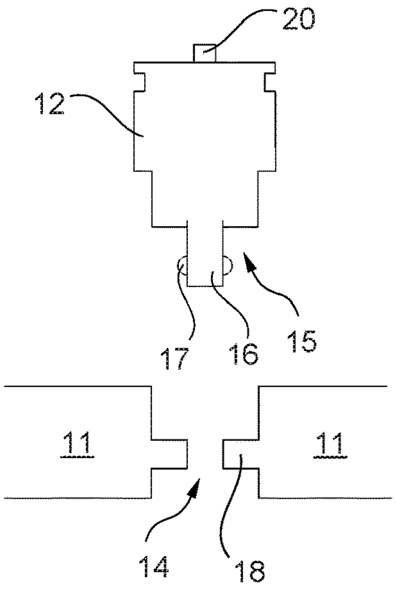
FIG. 7 shows the gripping element removed from the arm.

FIG. 7 shows the gripping element 12 removed from the arm 11. The coupling parts 15, 16 of FIG. 6 are unlocked by activating the release element 20, which in turn prompts the locking elements 17 to retract into the pin. The gripping element 12 is removed by simply moving the gripping element 12 out of the hole and away from the arm 11.

FIG. 8 shows a second embodiment of the release connection 14' between the arm 11' and the gripping element 12' in the form of another quick-release coupling. Here, the first coupling part 15 is formed by a pin 21 projecting from the top side of the arm 11'.

The second coupling part 16' is formed by a cavity in the bottom end of the gripping element 12'. The locking elements 17' are arranged in a side surface of the cavity and extends into a matching recess 22 located on a side surface of the pin 21.

Figure 9:
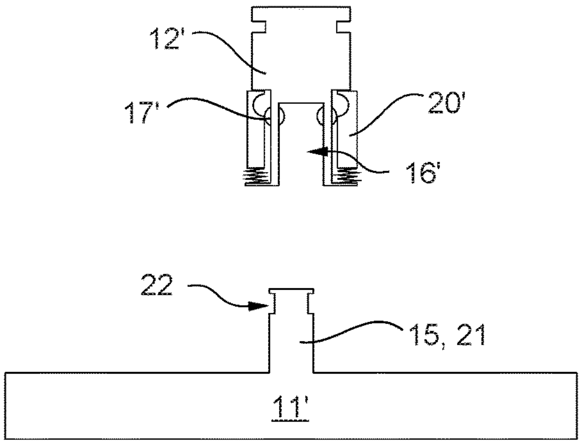
FIG. 9 shows the gripping element removed from the arm.

FIG. 9 shows the gripping element 12' removed from the arm 11'. The coupling parts 15', 16' of FIG. 8 are unlocked by activating the release element 20', which in turn prompts the locking elements 17' to retract into the side walls of the gripping element 12'. The gripping element 12' is removed by simply moving the gripping element 12' away from the pin 21.

Figure 10:
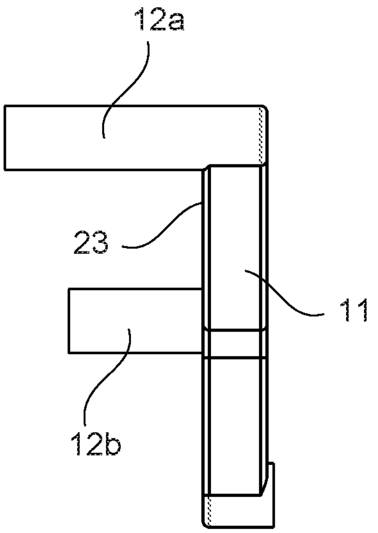
FIG. 10 shows the arm with a first gripping finger and a second gripping finger being shorter than the first gripping finger.

FIG. 10 shows the arm 11 with a first gripping finger 12*a* arranged at the second end. A second gripping finger 12*b* is further arranged at the intermediate position. The first and second gripping fingers 12*a*, 12*b* are releasable connected to the arm 11.

The arm 11 has a thickness measured between a bottom side and a top side 23. The first gripping finger 12*a* has a first height measured from the top side 23 to an end surface of the gripping finger 12*a*. The second gripping finger 12*b* has a second height measured from the top side 23 to an end surface of the gripping finger 12*b*. Here, the first height is greater than the second height.

Figure 11:
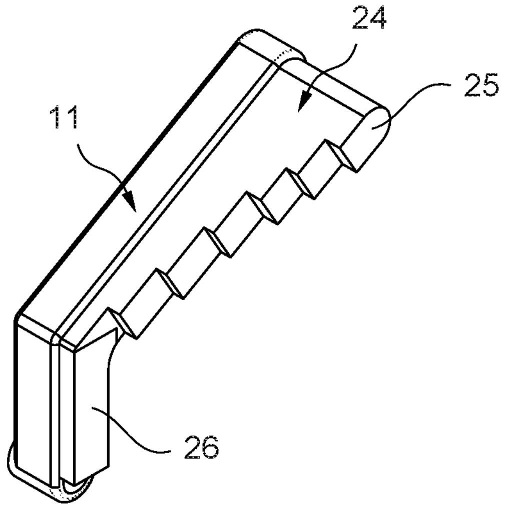
FIG. 11 shows a first embodiment of an elongated gripping element arranged on the arm.

FIG. 11 shows a first embodiment of an elongated gripping element 24 arranged on the arm 11. Here the elongated gripping element 24 is releasably connected to the arm 11 by means of two release connections 14 as mentioned above.

The elongated gripping element 24 extends along the top side 23 of the arm 11 from a local first end 26 to a local second end 25. The elongated gripping element 24 has a height measured from the top side 23 to a local top side. Here, the elongated gripping element 24 has a stepped profile that tapers from the local second end 25 to the local first end 26.

FIG. 12*a-f* show six alternative embodiments of the gripping element 12. Here, the gripping element 12 is shaped as a finger where the bottom end 27 of the gripping element 12 is shaped to form the first coupling part.

Figure 12A:
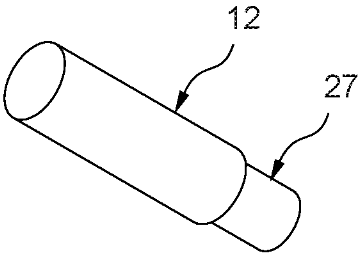
FIGS. 12*a-f* show six alternative embodiments of the gripping element.
Figure 12B:
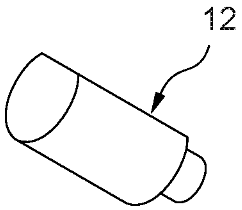
Figure 12C:
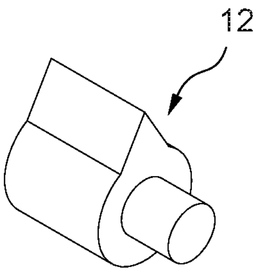
Figure 12D:
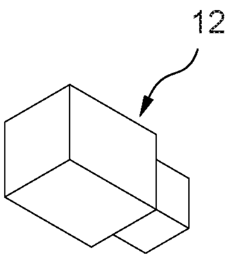
Figure 12E:
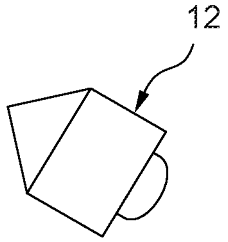
Figure 12F:
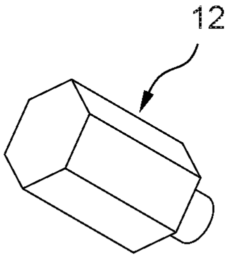

In FIG. 12*a*, the gripping element 12 has a circular cross-sectional profile. The gripping element 12 has in FIG. 12*b* a circular cross-sectional profile with a flat sub-surface for contacting an adjacent gripping element 12 when rotated into the retracted position. In FIG. 12*c*, instead of a flat sub-surface the gripping element 12 have a projecting portion. Here, the projecting portion has a triangular shape, but other shapes may be used.

The gripping element 12 has in FIG. 12*c* a square or rectangular cross-sectional profile. The gripping element 12 has in FIG. 12*d* a triangular cross-sectional profile. Finally, the gripping element 12 has in FIG. 12*e* a polygonal cross-sectional profile.

Although the gripping element 12 in FIGS. 12*a-e* has a constant profile along the height, the profile of the gripping element 12 may vary along the height. In example, the gripping finger 12 may have cone-shaped or tapered profile in height direction.

Figure 13A:
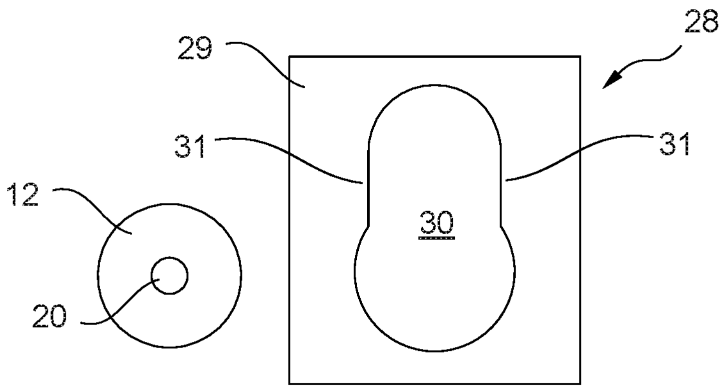
FIGS. 13*a-c* show the positioning of the gripping element on the exchange station.
Figure 13B:
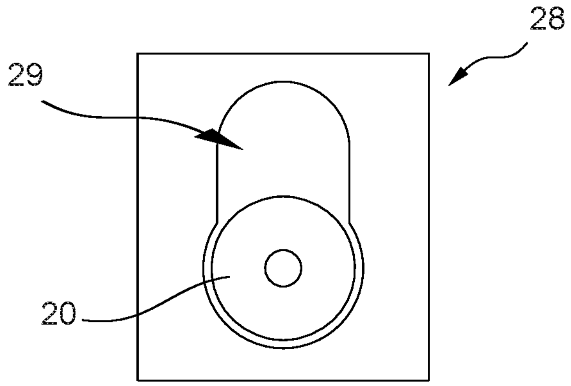
Figure 13C:
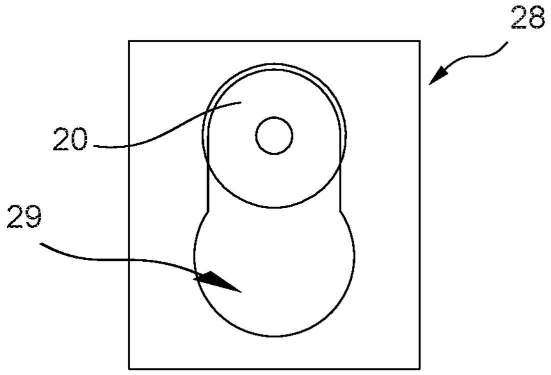

FIGS. 13*a-c* show a first embodiment of an exchange station 28 configured to interact with the gripping tool 1. The exchange station 28 comprises a single holding position for holding the gripping element 12.

The exchange station 28 comprises a support element 29 in the form of a base. A single recess 30 is arranged in the base 29, where the recess 30 forms the mounting position. The recess 30 is shaped as an elongated recess, which at one end comprises flanges 31. The flanges 31 are configured to engage the recess 19 on the gripping element 12.

The top end of the gripping element 12 is positioned relative to the recess 30, as shown in FIG. 13*b*. Then, the top end is moved into the recess 30. The release element 20 is thereby brought into contact with a bottom surface of the recces 30, which automatically unlocks the coupling parts 15, 16.

The gripping element 12 is moved, e.g. slid, along the length of the recess 30 unto the flanges 31 engages the recess 19 on the gripping element 12.

The arm 11 is afterwards removed from the gripping element 12 and the arm 11 can be repositioned relative to another gripping element (not shown).

Figure 14:
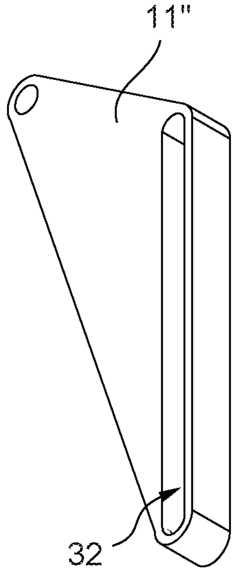
FIGS. 14*a-b* shows an alternative embodiment of the arm with an elongated hole.

FIG. 14 shows an alternative embodiment of the arm 11" having an elongated hole 32 formed in a body of the arm 11". The elongated hole 32 defines a plurality of mounting positions for selectively positioning the gripping element 12 along a length of the arm 11".

The gripping element 12 can be selectively mounted in any position along the length of the elongated hole 32. The gripping element 12 is held in a selected position by a locking force.

Figure 15:
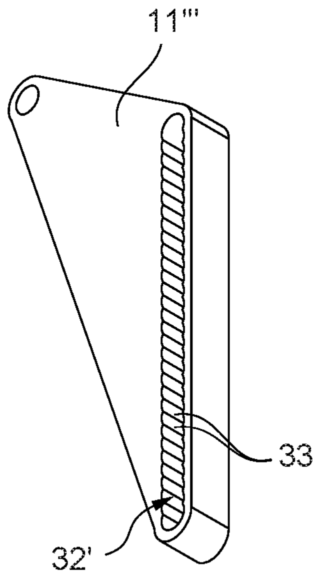
FIG. 15 shows a further alternative embodiment of the arm with the elongated hole.

FIG. 15 shows an alternative embodiment of the elongated hole 32' on the arm 11". Here the elongated hole 32' comprises a plurality of slots 33 each defining a selective position for the gripping element 12. The gripping element 12 is here held in place by a box joint.

Figure 16:
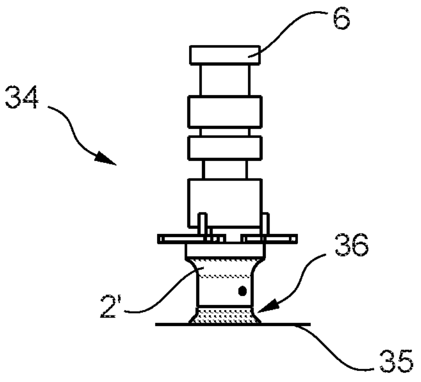
FIG. 16 shows a clamping tool with the gripping tool holding an object.

FIG. 16 shows a clamping tool 34 with the gripping tool 2 holding an object 6 where the clamping tool 34 is arranged on a surface 35. The clamping tool 34 comprises an adapter element 36 configured to be placed on the surface 35 and to be coupled to the first end of the gripping tool 2.

The clamping tool 34 has an internal energy source powering the gripping tool 2 and a user interface (not shown). The user interface is electrically connected to a local controller arranged inside the clamping tool 34. The operation of the gripping tool 2 is controlled by the local controller.

Figure 17:
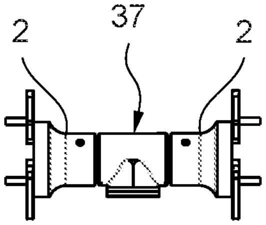
FIG. 17 shows a tool connecter for mounting multiple tools.

FIG. 17 shows a tool connecter 37 for mounting multiple tools, preferably multiple gripping tools 1. The tool connecter 37 is configured to be mounted to a machine, preferably the robotic arm 3 of the robot unit.

Figure 18:
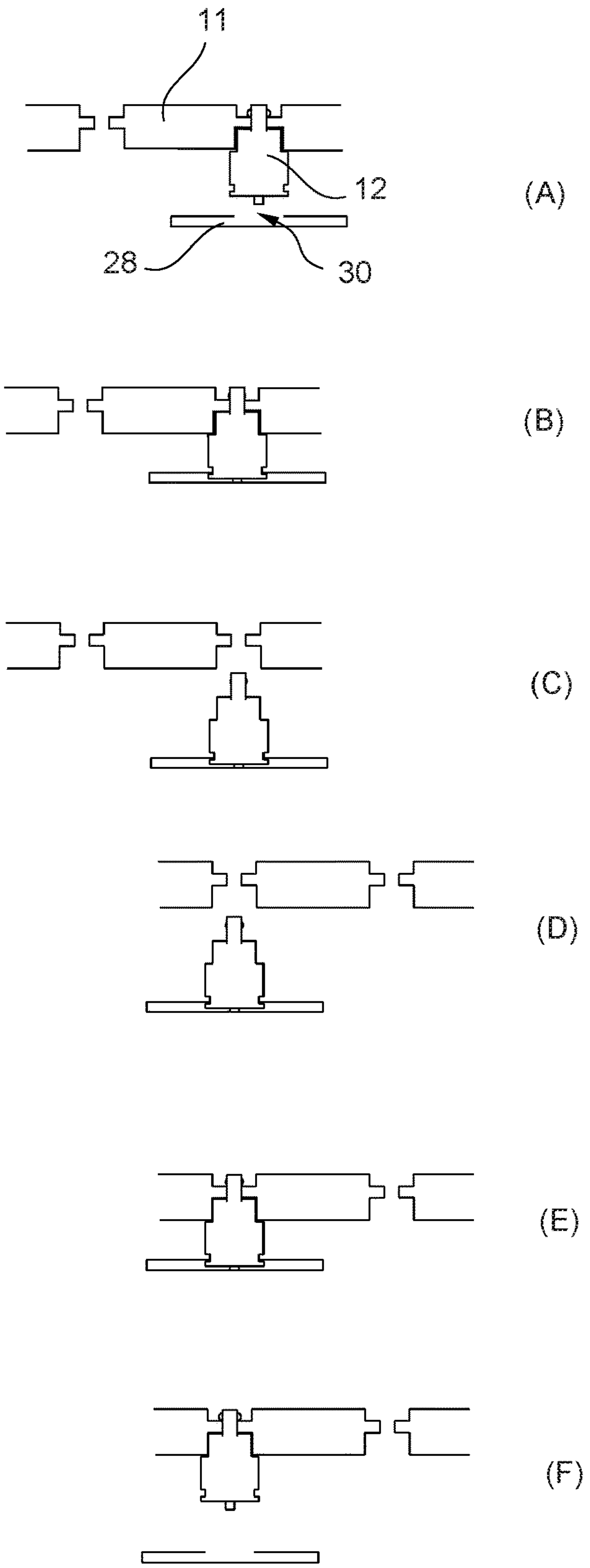
FIG. 18 shows a method of repositioning the gripping element.

FIGS. 18*a-f* show a method of repositioning the gripping element 12 on the arm 11 using the exchange station 28. The arm 11 is aligned with a selected holding position on the exchange station 28 as shown in FIG. 18*a*. The gripping element 12 is moved into the recess 30 so the release element 20 is activated as shown in FIG. 18*b*. The gripping element 12 is slid into engagement with the flange 31 in the recess 30, as shown in FIG. 13*c*.

The arm 11 is then moved away from the gripping element 12 and repositioned relative to the exchange station 28 as shown in FIGS. c-d. The arm 11 is then moved into engagement with the gripping element 12 as shown in FIG. 18*e*. The arm 11 and gripping element 12 is then moved out of engagement with the flanges 31. Finally, the arm 11 and gripping element 12 are moved away from the exchange station 28.

Figure 19:
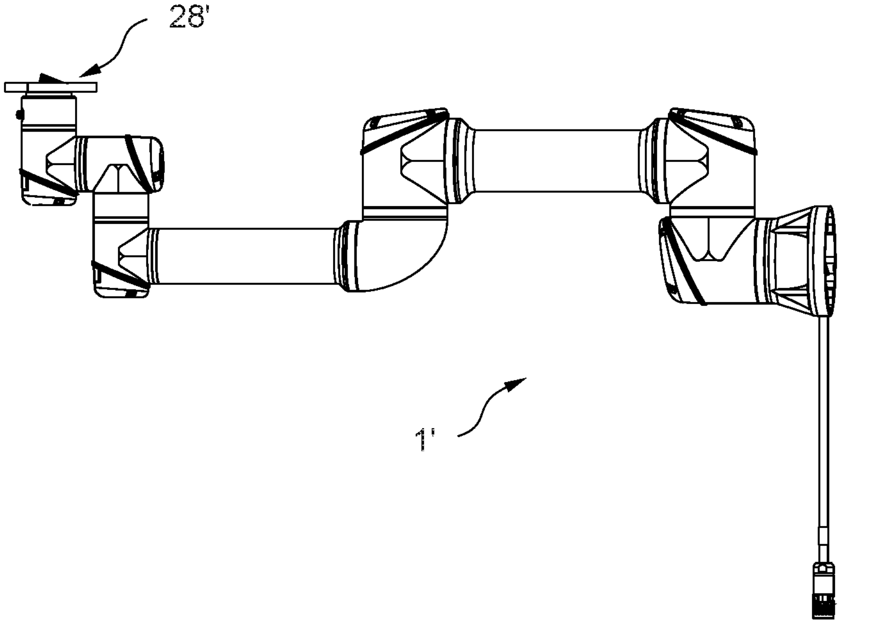
FIG. 19 shows another robot unit with the exchange station coupled to robotic arm.
Figure 20:
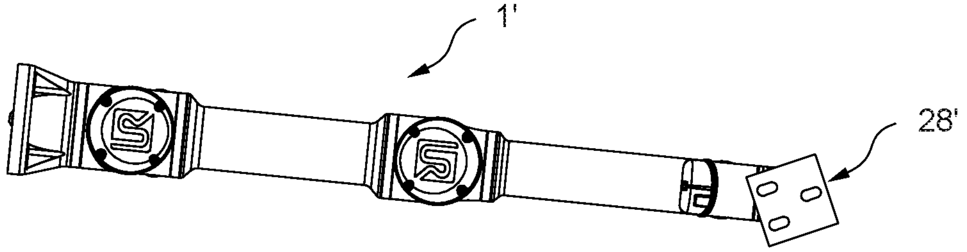
FIG. 20 shows the robot unit of FIG. 19 from the side.

FIGS. 19-20 show another robot unit 1' having a robotic arm, where the exchange station 28' is coupled to the interface on the free end. The exchange station 28' comprises a plurality of holding positions for individual gripping elements 12.

The invention claimed is:

1. A gripping tool for handling objects in a process, comprising:

a housing defining a longitudinal axis of the gripping tool, a drive mechanism arranged with the housing, an interface arranged at one end of the housing, the interface being configured to be coupled to a matching interface of a machine or to be arranged on a surface, a plurality of arms being arranged at an opposite end of the housing, each arm comprising at least one gripping element configured to be brought into contact with the object, each arm is configured to be rotated around a rotation axis, when activated by the drive mechanism, in or out of contact with an object in a radial plane perpendicular to the longitudinal axis, wherein each arm comprises a body extending from a first end to a second end and having a top side, a bottom side, a first side and a second side and wherein the at least one gripping element comprises a recess arranged in an external surface, wherein the recess is configured to engage a matching flange with complementary features on an exchange station, wherein each arm comprises one mounting position for the at least one gripping element arranged in the top side, wherein the at least one gripping element is releasably connected to that arm via a quick-release coupling.

2. The gripping tool according to claim 1, wherein each arm comprises a plurality of mounting positions for selectively positioning the at least one gripping element along a length of the arm.

3. The gripping tool according to claim 1, wherein the quick-release coupling comprises a first coupling part arranged on the arm and a second connecting part arranged on the at least one gripping element, wherein one of the first and second coupling parts comprises at least one locking element configured to interlock the first and second coupling parts relative to each other.

4. The gripping tool according to claim 3, wherein the quick-release coupling further comprises a release element configured to contact the least one locking element, where the release element is configured to move the at least one gripping element towards the locked or unlocked position upon activation.

5. The gripping tool according to claim 1, wherein the at least first gripping element is shaped as a finger or an elongated gripping element extending along at least a part of a length of the arm.

6. The gripping tool according to claim 1, wherein the at least first gripping element is configured to be operated within a full gripping range of the gripping tool while maintaining each arm in the same radial position relative to each rotation axis.

7. A system configured to handle objects in a process, comprising:

a machine configured to process an object, the machine comprises at least one interface configured to be coupled to at least one tool, the at least one tool being a gripping tool according to claim 1, the machine further comprises an energy source for supplying power to the gripping tool and a controller configured to at least control the operation of the gripping tool.

8. The system according to claim 7, wherein the machine is a robot unit with at least one robotic arm, wherein the robotic arm extends from a base end to a free end, the matching interface being located at the free end of the robotic arm.

9. A method of handling objects in a process using a system according to claim 8, comprising the steps of:

placing the gripping tool in an unloaded state;

activating a release connection between the arm and a first gripping element to remove said first gripping element;

repositioning said first gripping element in a second mounting position on the arm, and/or positioning a second gripping element in the first mounting position or in a second mounting position on the arm;

and reconnecting the first or second gripping element to the arm by locking the release connection.

10. The method according to claim 9, wherein the method further comprises:

said removing the first gripping element and said reconnecting the first or second gripping element is performed manually.

11. The method according to claim 9, wherein the method further comprises:

said activating of the release connection is performed by moving the arm, e.g. axially, relative to an exchange station to bring the first gripping element into a holding position on the exchange station;

repositioning the arm relative to the exchange station to align the first or second gripping element relative to the first or second mounting position on the arm, said reconnecting of the first or second gripping element is performed by further moving the arm, e.g. axially, relative to the exchange station to bring the first or second gripping element into the first or second mounting position on the arm.

12. A clamping tool configured to handle objects in a process, the clamping tool being configured to be arranged on a surface, the clamping tool comprising:

a gripping tool according to claim 1, a local controller configured to control the operation of the gripping tool, wherein the local controller is electrically connected to at least one of a remote user interface or a local user interface, at least one of a local energy source or coupling elements configured to be connected to an external energy source, the local or external energy source being configured to supply power to the clamping tool.

13. The clamping tool according to claim 12, wherein the clamping tool further comprises an adaptor element having a bottom surface shaped to be arranged on the surface, the adaptor element further has a top surface configured to be coupled to or integrated into the interface of the gripping tool.

14. An exchange station configured to interact with the gripping tool according to claim 1, wherein the exchange station comprises:

a support element, at least one holding element arranged on a top surface of the support element, the at least holding element being configured to engage a matching holding element on at least one gripping element.

15. The exchange station according to claim 14, wherein the at least one holding element is arranged in a recess in the top surface, wherein the recess is configured to receive a top end of the at least one gripping element.

16. The exchange station according to claim 14, wherein the support element is a base configured to be positioned on or fixed to a reference surface, or the support element comprises an interface configured to be coupled to a matching interface of a machine.

17. The gripping tool according to claim 1, wherein the complementary features include a recess that is complementary to the recess arranged in the external surface.

* * * * *